(12) United States Patent
Jones et al.

(10) Patent No.: US 9,472,955 B2
(45) Date of Patent: Oct. 18, 2016

(54) EMERGENCY LIGHT AND CHARGER SYSTEM

(71) Applicants: Keene Jones, Richmond, KY (US); Russie Jones, Richmond, KY (US)

(72) Inventors: Keene Jones, Richmond, KY (US); Russie Jones, Richmond, KY (US)

( * ) Notice: Subject to any disclaimer, the term of this patent is extended or adjusted under 35 U.S.C. 154(b) by 253 days.

(21) Appl. No.: 13/967,344

(22) Filed: Aug. 15, 2013

(65) Prior Publication Data

US 2013/0334881 A1  Dec. 19, 2013

Related U.S. Application Data

(63) Continuation-in-part of application No. 12/856,859, filed on Aug. 16, 2010, now abandoned.

(60) Provisional application No. 61/755,572, filed on Jan. 23, 2013, provisional application No. 61/274,610, filed on Aug. 19, 2009.

(51) Int. Cl.
| | | |
|---|---|---|
| *H05B 39/10* | (2006.01) | |
| *H02J 4/00* | (2006.01) | |
| *H05B 37/02* | (2006.01) | |

(52) U.S. Cl.
CPC ............ *H02J 4/00* (2013.01); *H05B 37/0227* (2013.01); *Y10T 307/344* (2015.04)

(58) Field of Classification Search
None
See application file for complete search history.

(56) References Cited

U.S. PATENT DOCUMENTS

| | | | |
|---|---|---|---|
| 4,096,553 A | 6/1978 | Roche | |
| 5,426,347 A | 6/1995 | Nilssen | |
| 5,734,229 A | 3/1998 | Bavaro et al. | |
| 6,057,646 A * | 5/2000 | Pieroth et al. | ................ 315/149 |
| 6,107,744 A | 8/2000 | Bavaro et al. | |
| 6,236,622 B1 | 5/2001 | Blackman | |
| 7,461,956 B2 | 12/2008 | Swanson | |
| 7,897,277 B2 | 3/2011 | Meyer et al. | |
| 7,990,252 B2 | 8/2011 | Barton | |
| 2008/0030140 A1 | 2/2008 | Pape et al. | |
| 2008/0074860 A1 | 3/2008 | Swanson | |
| 2008/0080162 A1* | 4/2008 | Wilcox et al. | ................. 362/20 |
| 2008/0101078 A1* | 5/2008 | Stokes | ........................ 362/470 |
| 2008/0258628 A1* | 10/2008 | Higley et al. | ................... 315/86 |
| 2009/0322228 A1* | 12/2009 | Bakre et al. | .................... 315/86 |
| 2013/0147376 A1* | 6/2013 | Trainor et al. | ............ 315/200 R |

* cited by examiner

*Primary Examiner* — Cassandra Cox
(74) *Attorney, Agent, or Firm* — Smith Tempel Blaha LLC; Gregory Scott Smith

(57) ABSTRACT

A battery powered device that interfaces with the power source of a target device, such as a lamp, and detects when the primary power source has been removed. When the primary power source is available, the battery is charged and when the primary power source is not available, the battery drives an illumination device to provide emergency safety light to an area.

15 Claims, 6 Drawing Sheets

EMERGENCY LIGHT AND CHARGER SYSTEM

CROSS-REFERENCE TO RELATED APPLICATIONS

This is a utility patent application being filed in the United States as a non-provisional application for patent under Title 35 U.S.C. §100 et seq. and 37 C.F.R. §1.53(b) and, claiming the benefit of the prior filing date under Title 35, U.S.C. §119(e) of the United States provisional application for patent that was filed on Jan. 23, 2013, and assigned Ser. No. 61/755,572, which application is incorporated herein by reference in its entirety. This application is also a continuation-in-part of the Unites States non-provisional application that was filed on Aug. 16, 2010 and assigned Ser. No. 12/856,859, which application claims the benefit of the prior filing date under Title 35, U.S.C. §119(e) of the United States provisional application for patent that was filed on Aug. 19, 2009 and assigned Ser. No. 61/274,610, which applications are incorporated herein by reference in their entirety.

BACKGROUND

Rely-a-light was birthed out of the occurrence of the worst ice storm that the south has seen in 25 years. During this time, the company had no product, the company had no name, in fact, there was no company or employees—all there was just an idea. The father of one of the founders, who suffered from mild Alzheimer's and COPD, lived with the founders. During the storm, the founders of the company were plunged into darkness on a cold February night around 9:30 pm. The founder's father got up to investigate the power outage, got tangled in his oxygen tubing and fell. Thankfully he was ok, but it put thoughts in motion. How could such an incident be prevented from happening again? What if he had been badly hurt and lived alone? How many people fumble around in the dark during a power outage? Benjamin Franklin once said, "Necessity is the mother of invention." He was right. Rely-a-light was born that week at the kitchen table. The founder began to work at finding a solution to this dilemma. One of the founders, having a background in electrical contracting, came up with the electrical configuration and materials from junk in our garage. The other founder, with a background is in Interior Design, worked on other aspects of the product and together, they formulated an idea, reduced it to practice and designed a product to address this need in the art.

Thus, there is the need in the art for an emergency back up lighting system that can automatically provide illumination to an area during a power outage.

There are numerous commercial and industrial emergency lighting systems that provide backup lighting during emergency situations, such as when power is lost due to a fire or otherwise. The purpose of such systems is to provide a sufficient level of ambient light to enable individuals to safely move around the area and/or to find an exit. The systems that are available are typically focused on commercial applications and environments and thus, they are not easily purchased and installed by a consumer in a home environment. Typically, the available lighting systems are mounted to a wall or ceiling and are hardwired into the electrical system for the building. The devices are not mobile and thus, once installed are generally permanent fixtures. These industrial lightly systems are also not designed for the aesthetic of household use. They tend to be bulk, boxy and gray. There is a need, therefore, for an emergency back up lighting system that is specifically designed for household use, that can be easily moved from one location to the next as desired, is easily installed and uninstalled and, is aesthetic suitable for household usage.

BRIEF SUMMARY

The present disclosure presents embodiments, as well as features, aspects, elements, functions, etc., of a device or apparatus that can be connected to, incorporated within, or used in conjunction with another device and to bring additional functionality to such device or, alternative functionality if the functionality of the device is disrupted. For instance, the device could be, as non-limiting examples, an ordinary desk lamp, table lamp, floor lamp etc., (lamps) as well as other devices such as appliances, electronics, etc. In addition, the present disclosure presents a method of applying a conversion to such devices to bring additional functionality to such device, or alternative functionality if the functionality of the device is disrupted.

In general, an exemplary embodiment of the device or conversion is used in connection with a lamp and operates to provide ambient light and charging capabilities (such as a USB charger) for various other devices. In such an exemplary embodiment, when the primary source of power (i.e., 110-120 VAC, 210-220 VAC, or other power source such as an uninterruptable power supply or a DC voltage source that provide power to items in a home or office) is available, the lamp operates as normal and the device, although optionally available for use, is not really required. However, during a power outage in which there is a loss of the primary source of power, the device can be actuated by a user, or automatically commence operation to provide ambient light and charging capabilities.

The various embodiments may be described as a battery powered lighting system that parasitically attaches to a target device, such as a lamp, appliance, etc. When primary power is removed from the target device, the battery powered lighting system is powered on to provide light. When the primary power is present, the battery for the system can be charged utilizing the power that drives the target device.

DETAILED DESCRIPTION OF EMBODIMENTS OF THE INVENTION

The present disclosure presents embodiments, as well as features, aspects, elements, functions, etc., of a device or apparatus that can be connected to, incorporated within, or used in conjunction with another device and to bring additional functionality to such device, or alternative functionality if the functionality of the device is disrupted.

Although the various embodiments presented herein are not necessarily safety devices, they certainly may include or incorporate safety features or operate to provide safety to others and as such, each embodiment will be collectively referred to herein as a safety adapter or as an SA. It should be appreciated that the terms SA is used generically of all embodiments described regardless of the features or configurations, as well as other anticipated embodiments and as such, the use of the term SA is not to be construed as a limitation.

As will be appreciated by the ordinary person skilled in the art, the various embodiments of the SAs that are presented herein may operate in conjunction with a variety of devices, equipment, etc., and as such, the embodiments presented herein are presented by way of example and are not intended to be limiting. However, the various embodiments presented here, as well as the features, aspects, etc., incorporated into such embodiments may be considered to be novel and non-obvious inventions in and of themselves.

Turning now to the drawings in which similar elements are identified by similar labels throughout the various views, embodiments of the SA, as well as features, applications, etc., are presented in more detail.

Figure 1:
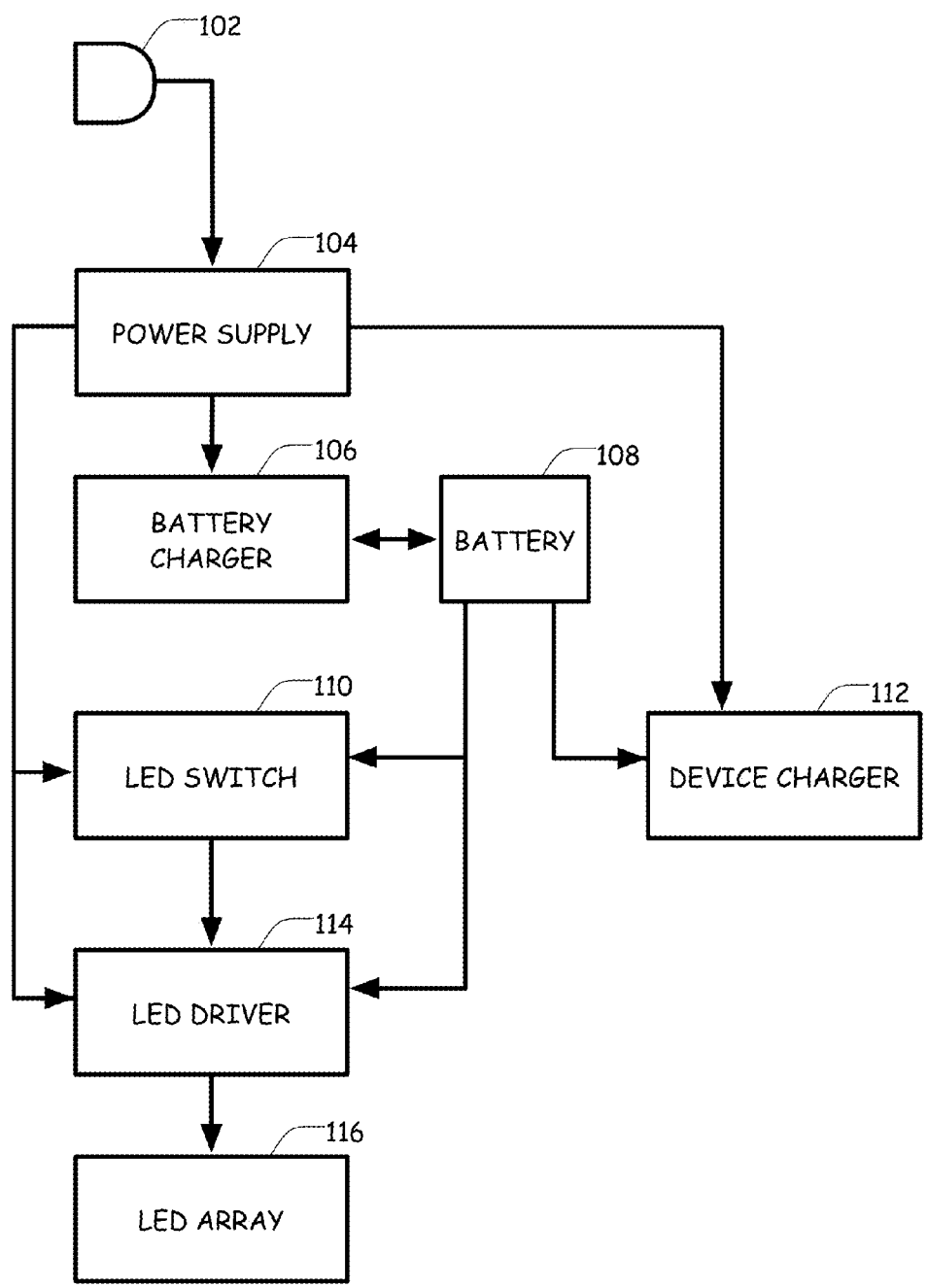
FIG. 1 is a block diagram illustrating functional components of an embodiment of an SA.

FIG. 1 provides a general block structure for an exemplary embodiment of an SA while FIG. 2A-FIG. 2F present detailed schematic diagrams illustrating exemplary circuits that could be incorporated into various embodiments of the SA for performing various functions. Before delving into the details, it should be understood that in some embodiments, the circuits could be implemented on a single circuit board designed and configured to fit into the base or stem of a lamp without interfering with the normal operation of the lamp while powered by an AC power source. In such embodiments, the lamp or target device may actually be constructed or manufactured to include the SA. In other embodiments, the circuitry may be incorporated into a casing or module that is mounted to a lamp, under a lamp, proximate to the lamp (such as being located along the lamp cord) or otherwise integrated and/or embedded with the lamp or other target device. The circuits can be constructed on a printed circuit board (PCB), flexible circuit board or other assembly technique. In general, the circuits provide the function of receiving or interfacing to a primary power source during one mode of operation (normal mode) and charging, if necessary a battery during such mode. Further, the circuits provide the function of sensing a loss of the primary power source and, in such a mode (emergency mode), operate to provide a safety and/or an alerting function. For instance, a safety function may be to illuminate one or more low current or low power illumination devices, such as light emitting diodes (LED). An alerting function may include sounding an alarm or buzzer, initiating the delivery of a notification message such as by placing a call or sending an electronic message, or otherwise. The term SA will also be used throughout this disclosure to refer to any of the various embodiments regardless of the mounting and interface technique.

The control circuitry that defines the operation of the SA may be included on one board while the illumination and/or alerting devices, such as an LED array, may be mounted on a separate PCB board, flexible strip, etc. As a non-limiting example, the control circuit can be designed to fit into the base of a table lamp, or other illumination device, without interfering with the normal operation of the table lamp while powered by a primary power source (i.e., 110-120 VAC, 210-220, or other power source such as an uninterruptable power supply or a DC voltage source that provide power to items in a home or office). The low power illumination devices can be constructed on a flexible circuit that is attached to a circular or cylindrical ring, open ring, U-shaped platform or any of a variety of other shapes, that can then be placed over the stem of the lamp, on top of the lamp shade, on top of the base, inside the lampshade, etc. In some embodiments, the illumination devices are referred to as the LED array but, it will be appreciated that other low current consuming illumination devices may also be utilized such as electroluminescence materials, etc. The LED array may thus be constructed in any of a variety of manners such that it can be associated with or joined to the target device, such as a lamp.

It should be appreciated that the various embodiments of the SA may constructed of electronic components and hardware only, may be constructed using electronic components and customer integrated circuits, may be constructed using software and microprocessors with interfacing hardware and/or components, or in a variety of other suitable manners.

In some embodiments, the LED array may be incorporated into a lampshade. In such embodiments, when the LED array is powered, one or more of the LEDs may be configured to illuminate the interior of the shade and thus, due to light reflection, may provide a wider spread of illumination. Further, one or more of the LEDs may be configured to illuminate exterior to the shade or be directed upwards or downwards. Further, a combination of two or more of these techniques as well as others may also be utilized in various embodiments.

The SA operates under battery power when the primary power source is removed. In an exemplary embodiment, the battery may be a Lithium Ion battery. The battery can be mounted to our associated with the target device in a variety of manners, such as placing the battery in the base of a lamp, attaching the battery to the power cord of the lamp, including the battery in a housing that fits in the base of the lamp, is attached to the power cord of the lamp or is plugged into an outlet and provides a receptacle for the lamp cord to be plugged into the housing. In another embodiment, the SA may include a receptacle that can receive the plug end of a lamp or other target device, and also include a length of cord that can be plugged into the wall. As such, the SA could operate as a power strip in addition to providing ambient light and alerts during a power down condition. Thus, multiple lamps or target devices could be plugged into a single SA or, the cord for the target device can be retracted within the target device and plugged into the SA and, the cord from the SA would be used to plug into a wall or floor or other outlet.

In an exemplary embodiment, the battery is attached within the base of a lamp and is held in place (in the base) by a battery box or mechanical feature that are incorporated into the PCB enclosure. The USB port (socket) can be affixed inside the base or PCB enclosure. The USB socket can thus be accessible through an external opening in the lamp base.

In an exemplary embodiment, the SA can be configured for incorporation into an ordinary table lamp. Such an embodiment may operate for the purpose of providing ambient light and USB port charging capabilities to users when the main source of power (such as 115 VAC, 220 VAC, etc.) is unavailable (i.e., during a power outage). For instance, the typical table lamp is normally used during low-light periods (such as night-time, evening or early morning time periods) or in low light areas (such as hallways, interior rooms, closets, bathrooms, etc.). When AC power is available, the lamp operates as normal. However, when AC power is removed, the lamp is incapable of providing light to the local area thus leaving the local area in the dark. An embodiment of an SA working in conjunction with a lamp, the SA will operate to provide illumination in such a condition and as such, during the loss of AC power, the area of concern can still be illuminated. Thus, the embodiments of an SA operate to provide an emergency light capability during power outages.

Any of the embodiments of an SA may also include the capability of sensing if the light bulb or illumination source in the lamp has burned out or ceased to work. For instance, a current sensor could be used to detect that the illumination source is no longer drawing current (indicating that the illumination source has burned out) and then function to illuminate the area by providing power to the low current illumination devices. Alternatively, a light sensor could be used to detect that the light bulb has burned out.

In addition to providing lighting, the various embodiments of the SA may also provide a charging function for other devices. In an exemplary embodiment, the charging function includes a common port or adaptor, such as a USB port. The USB port may support the charging of a cellular telephone or a tablet type device during normal conditions when AC power is available, as well as during power outages by sourcing the charging circuitry with battery power. Thus, it will be appreciated that the various embodiments of the SA can operate to provide continued light as well as the ability to charge other devices during a power outage.

As a specific example, an embodiment of the SA may utilize an 8.1 volt, 2.6 Ah Lithium Ion battery as the standby/emergency power source. In another embodiment, the SA may include a 6.4 volt 4.5 Ah sealed lead acid (SLA) battery. However, it will be appreciated that a variety of rechargeable batteries can be utilized with the basic design simply by adjusting/changing a few of the components and adjusting control trigger voltage levels, etc. In the various embodiments, the battery operates to supply power to the control circuitry as well as the LED array.

In the various embodiments, the battery may constantly be under a charge cycle during standby periods (when the lamp is powered by the primary power source) so as to ensure that a fully charged battery is available when the primary power source is not available. Some rechargeable batteries that may be used in various embodiments of the SA may not respond well to being over charged and actually experience a degradation in life and/or performance under such conditions. To address this issue, the SA may include circuitry or functionality (i.e., software, hardware, firmware, combinations of these as well as other) that operates to terminate the charging process when the battery charging voltage has reached the top-end of the charge cycle.

Additionally, some rechargeable batteries do not respond well to being excessively discharged and actually experience a degradation in life and/or performance under such conditions. To address this issue, the various embodiments of the SA may include the ability to terminate the additional discharge of current drain from the battery when the voltage level of the battery reaches (decays to) the end-point of the battery discharge cycle.

Thus, the general operation in various embodiments of the SA is to detect the loss of the primary power source and in such a condition, enable the battery to provide an auxiliary function such as lighting an array of LEDs. Once the primary power is restored, the SA will automatically respond by removing battery power from the auxiliary devices (i.e, LED array and/or device charger in some embodiments) and then commence the battery charging cycle.

In some embodiments, the SA may include one or more switches to enable or disable certain functionality of the SA. For instance, a switch may be used to enable or disable the charging function of the internal battery. In addition, a switch may be utilized to turn the SA on or off. For instance, when such a switch is off, regardless of the presence or absence of the primary power source, the SA would not operate to turn on the LED array. Further, this latter switch in combination with the previous switch may be used to prevent the SA from illuminating the LED array but, independently enable or disable the battery charging function. Further, a switch may be used to force the SA to illuminate the LED array regardless of the state of the primary power source. A switch may also be provided to enable or disable the device charging circuit, force the circuit off in either mode, force the function on in either mode, etc.

This various embodiments of the SA may be utilized in many different applications. As mentioned above, the SA can be used in a table lamp to provide emergency light and USB charging capability during a power outage. However, the SA can also be used in other devices such as cellular telephone docks, clock radios, MP3 docking stations, hanging lamps, appliances, and other similar devices in order to provide a source of light and device charging during a power outage.

FIG. 1 is a block diagram illustrating functional components of an embodiment of an SA. It should be appreciated that each of the illustrated components are not necessary in all embodiments of the SA and, the separation and functional boundaries are provide only for illustrative purposes in that certain functions can be combined or further divided in various embodiments. A primary power source 102 provides the primary power to operate a target device, such as a lamp, appliance or other electronic device. The primary power source has been defined as any of a variety of available AC or DC power sources. The primary power source 102 is fed into the power supply 104, which converts the received power source to the levels and the type of power necessary to operate the SA. The power supply provides a voltage output to a battery charger 106, and may also provide control or status signals. For example, the status signal could be used to indicate whether or not the primary voltage source 102 is available. As another example, a control signal could be used to enable or disable the battery charger 106. The status and/or control signal may be controlled by a sensor switch based on the state of the primary power, a manual switch that can be actuated by a user, or other criteria as well as combinations thereof.

The battery charger 106 provides a charging current to battery 108 and may monitor the status of the battery, such as its voltage level, temperature, current draw, etc.

The battery 108 provides power to the LED Switch 110 and the device charger 112. In addition, the LED Switch 110 and device charger 112 may receive power and/or control signals from the power supply 104. The LED switch 110 receives power from the power supply 104 to determine the presence or absence of the primary power source. In addition or alternatively, the power supply 104 may provide a status and/or control signal to the LED switch 110 to indicate the state of the primary power or to force the LED switch to change state. Similar to the battery charger 106, the status and/or control signal may be controlled by a sensor switch based on the state of the primary power, a manual switch that can be actuated by a user, or other criteria as well as combinations thereof. In addition, the LED switch can optionally be powered by the primary power source and as such, by providing a switch on the SA, a user can select to operate the target device and/or the LED array at will when the primary power source 102 is available. Thus, the interface between the power supply 104 and the LED Switch may a control line, a power supply line or a combination of both.

The device charger 112, similar to the LED switch 110 can receive power from the power supply 104 and/or the battery 108. Thus, the device charger 112 can likewise be available when the primary power source 102 is available or when it is removed.

The LED switch 110 controls the LED driver 114 by providing a signal to indicate whether or not the LED array 116 should be turned on or off. For instance, in one embodiment, when the primary power source 102 is absent, the LED switch 110 can detect this case and send a control signal to the LED Driver 114 to cause the battery power source 108 to be provided to the LED array 116. Further, the LED switch may interface to a physical switch that can be actuated by a user. When the switch is thrown to an ON position, the LED switch can send a signal to the LED driver 114 to cause the LED array 116 to be illuminated. Thus, the switch can be placed into the ON position when the primary power source 102 is available, thus drive the LED array 116 from the primary power source, or when the primary power source 102 is not available thus driving the LED array 116 from the battery 108. In some embodiments, the user switch may be overridden when the primary power source is removed and thus, automatically force the LED array 116 to be illuminated. In other embodiments, a photovoltaic device, light sensor and/or motion sensor may be used to detect the amount of ambient light in the area to determine whether or not to turn the LED array on or not. Similarly, a timer may be included to automatically turn the LED array 116 off after a threshold period of time and then upon detection of motion or light changes, turn the LED array 116 back to an illuminated state.

In some embodiments, the operation of the device charger, such as a USB port, will not be changed between operating under primary power or secondary power. However, it is anticipated that in some embodiments, a separate switch can be utilized for the device charger 112 or, the same LED switch 110 that disables or enables the provision of power to the LED array 104 may be sued to gate power to the device charger 112.

The battery 108 is subjected to a charge cycle during standby periods (when the lamp is being powered by the primary power source). Advantageously, this aspect of the SA allows the battery 108 in the SA to remain fully charged and fully ready to operate the SA if and when the primary power source is lost.

FIG. 2A-FIG. 2F are schematic diagrams illustrating exemplary implementations of the various components illustrated in FIG. 1. Various functions that can be incorporated into various embodiments of the SA are further explored in view of the circuits presented in these figures.

Figure 2A:
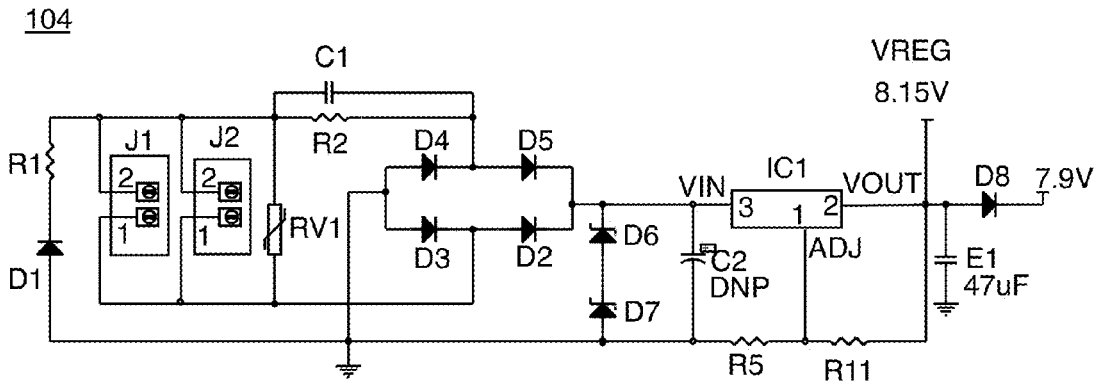
FIG. 2A is an exemplary circuit for a power supply convertor.

AC Main Power Source Connections:

FIG. 2A is an exemplary circuit for a power supply convertor. The primary power source used to operate the target device, such as a lamp, is also interfaced to the SA. Generally, in the lamp embodiments, this primary power source is connected to the lamp, such as through the base as a non-limiting example. In the lamp-based embodiment, the primary power source is generally connected to the main light bulb or bulbs (such as various wattages of incandescent bulbs or, as of late, a compact fluorescent light (CFL) bulb as non-limiting examples). As a specific example, the wiring for the primary power can be routed through the base of the lamp, up through the stem and terminate at a lamp switch which is used to control the ON-OFF states of the lamp.

The various embodiments of the SA include an interface into the primary power source wiring for obtaining power to operate the SA and for directing the operation of the SA. In one embodiment, installation of the SA can include the operation of cutting the power cord to the lamp and reconnecting the power cord through the SA. FIG. 2A illustrates a pair of connectors J1 and J2 to facilitate this connection. In operation, the power cord is cut or severed in two the two ends are stripped (insulation is removed). The end of the cord that leads to the duplex outlet or are attached to the power supply circuitry 104 at terminals 1 and 2 of connector J1. Terminals 1 and 2 of J1 are electrically coupled to the power supply circuitry 104 within the SA and ultimately provide power to the entire SA.

Terminals 1 and 2 of J1 electrically coupled to pins 1 and 2 of J2. The other end of the power cord is then connected to terminals 1 and 2 of J2. As such, the SA is effectively inserted in parallel with the lamp and the severed power cord this thus fully reconnected through the SA such that primary power is still provided to the lamp to restore the lamp to its original functionality. It should be appreciated that in some embodiments, a power line clamp may be used to interface the SA to the power cord. The power line clamp basically shrouds a power cable and includes a sharp spike that penetrates the insulation as the device is clamped to the power cord. Such devices tap into a power cord without having to sever the cord.

In another embodiment, the SA could be incorporated into a socket structure. For instance, the SA could be embodied in a package that includes a male screw connector that can be inserted into the light bulb socket of a lamp, and then include a female screw socket for receiving a light bulb. In such an embodiment, the SA can receive primary power from the socket and operate without disrupting the operation of the lamp.

A Varister RV1 is connected across terminals 1 and 2 of J2 and operates to suppress any power surge or extreme voltage transient that may occur on the primary power voltage line, thus protecting the SA from an over voltage or power surge condition. The primary power that is present at terminals 1 and 2 of J2 is also applied to the full-wave rectifier bridge consisting of diodes D2, D3, D4, and D5 through capacitors C1 or C2 (C1 and C2 provide the same functionality except that the physical size is different between them). Consequently, the SA can be configured to accept one or the other of these capacitors, but not both at the same time. In the illustrated embodiment of the SA, C2 has been selected as the primary component to be placed with the SA.

Reduction of the AC Input Voltage:

Capacitor C1 is an "in series with the mains" capacitor. The capacitive reactance (Xc) limits the current flow through it. In this application, it reduces the 115 VAC input voltage to approximately 10.4 VAC at the input of the full wave rectifier (D2, D3, D4 and D5) circuit when the battery is being charged. If there is no current draw (say when charging the battery has virtually stopped), the voltage at the output of the bridge would continue to rise; thus the need for the two zener diodes (D6 and D7) to limit the voltage. R2 is used to "bleed" the charge off of C1.

Capacitor C1 is "in series with the mains". The capacitive reactance (Xc) limits the current flow through it. In this application, it reduces the primary voltage input value. For instance, when the primary input voltage is 115 VAC, capacity C1 operates to reduce the voltage to approximately 10.3 VAC at the input to the full wave rectifier (D2, D3, D4, and D5) circuit when the battery is being charged. If there is no current draw (such as when the charging of the battery has been stopped), the voltage at the output of the bridge would tend to continue to rise; thus the need for the two zener diodes (D6 and D7) to limit or clamp the voltage. R2 is used to "bleed" the charge off of capacitor C2. Again, C1 may be used as an alternative capacitor to C2.

AC Voltage to DC Voltage Conversion:

The power supply circuit 104 converts the primary power to a DC voltage for powering the remainder of the SA. Diodes D2, D3, D4, and D5 form a full-wave rectifier circuit with approximately 10.3 VAC input and has an output of approximately 9.1 VDC while there is a current draw, such as when the battery is being charged. This voltage rises until it is clamped by D6 and D7 at approximately 13.9 VDC when the current demand has been reduced to the micro-amp region.

Zener diodes D6 and D7 are 6.8 VDC components that are connected in series. Together, they form a zener that limits DC voltages at pin 1 of IC1 to approximately 13.9 VDC when the current demand has been reduced to the micro-amp region (say, when the battery is fully charged).

Figure 2B:
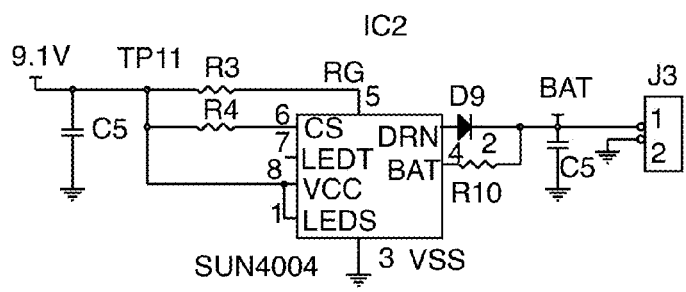
FIG. 2B is a schematic diagram illustrating an exemplary circuit that can be integrated into various embodiments of the SA to perform a battery charging function.
Figure 2C:
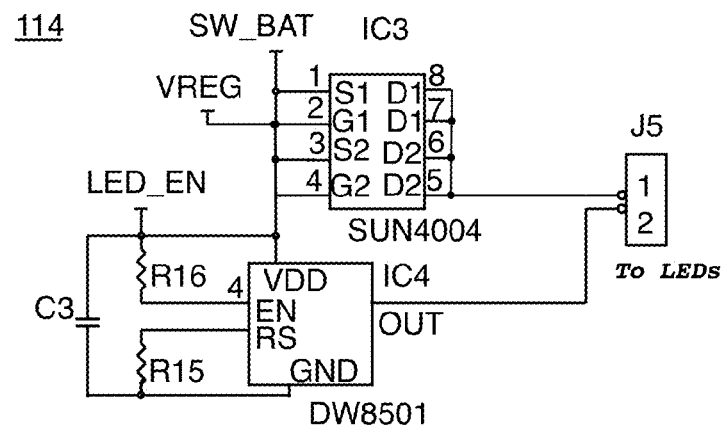
FIG. 2C is a schematic diagram illustrating an exemplary LED driver circuit for the SA.

The DC voltage resulting from the full wave rectifier bridge (D2, D3, D4, and D5) contains significant ripple (not smooth), which is filtered out (reduces/eliminates the ripple from the DC output) by capacitor C3 shown in FIG. 2C. However, this voltage varies with load (such as charging rate of the battery) and therefore, needs to be regulated for use in the remainder of the circuitry. Integrated circuit IC1 performs this voltage regulation.

LED and USB ON Upon Loss of Primary Voltage:

As previously mentioned, some embodiments of the SA sense the lost of the primary power source and then operate to turn on the LED array 116. IC1 is a voltage regulator, such as an LM317 as a non-limiting example. The voltage regulator IC1 receives the unregulated input voltage across the zeners D6 and D7 at pin 3 and provides an output voltage Vout sin the range of 8.15 VDC which is available at the terminal labeled VREG. Resistors R5 and R11 form a voltage divider and provides a control voltage to pin 1 (ADJ) of IC1. This control voltage functions to adjust the output voltage VOUT at pin 2 of IC1 to a desired level. In should be noted that a voltage value is present at VREG only when the primary voltage is present at J1/J2. Upon loss of the primary power signal, the IC1 output voltage VREG will go to approximately 0.0 VDC. Ultimately, this change in voltage when the primary power source is absent (power failure) will be detected by other parts of the circuit and the result will be (via hardware circuitry, software or both) to turn on the LED array 116 and DC power to the device charger 112.

FIG. 2C is a schematic diagram illustrating an exemplary LED driver circuit for the SA. The LED driver circuit 114 includes an electronic switching device IC3. The voltage output of IC1 (VREG) is connected to the input gates (pins 2 and 4) of IC3 shown in FIG. 2C. IC3 is a P-Channel MOSFET device, such as a SUN4004, that operates as a switch to enable/disable the provision of the DC voltage (SW_BAT) available at the source inputs of the MOSFET (S1 and S2/pins 1 and 3 respectively) to the device charger 112 and/or the LED array 116 (the DC voltage is created upon presence/loss of the primary power source). Upon loss of the primary power source, VREG goes to 0.0 VDC. The loss of VREG causes IC3 to close the source to drain switch, which then supplies the DC power (SW_BAT), which is available on the other side of a switch J4 (see FIG. 2E) from the battery 108 to the LED array 116 at J5, pin 1.

An additional voltage (other than the 8.15 VDC) is required to charge the battery. Consequently, diode D8 is utilized to drop the 8.15 VDC output voltage of IC1 (VREG) to approximately 7.9 VDC, as well as to keep the battery from discharging through the LM317 (IC1) and related circuitry when the primary power source is not present.

Figure 2D:
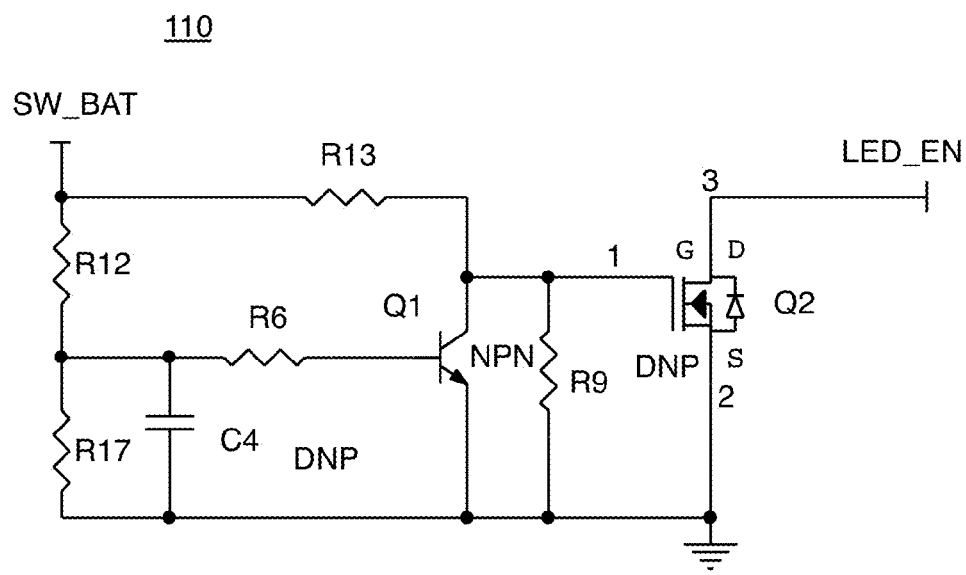
FIG. 2D is a schematic diagram of an exemplary LED switch circuitry that can be used to turn on the LED array.

FIG. 2D is a schematic diagram of an exemplary LED switch circuitry that can be used to turn on the LED array. The LED switch circuit 110 includes a transistor Q1, which is an N-Channel MOSFET that acts as a switch to control (Enable/Disable) the LED driver circuit 114. This switch Q1 can be used in various embodiments of the SA to add hysteresis to the LED ON function that is generated upon loss of the primary power source. It should be mentioned that there would need to be other components that would have to be populated/removed to implement the "delayed" functionality but such functionality could prevent the LED array 116 from being turned on in the presence of a short power glitch.

Overcharge Protection:

The longevity of rechargeable batteries is enhanced when the batteries are prevented from being overcharged. FIG. 2B is a schematic diagram illustrating an exemplary circuit that can be integrated into various embodiments of the SA to perform a battery charging function. IC2 acts as a switch to control the starting, stopping and or pausing of the charging cycle. In various embodiments, IC2 may be the SUN4004 integrated circuit. A charging current will only be provided to the battery during periods in which the AC voltage is present. That is, the output voltage from IC1 is applied (via D8) to the input of IC2. This will enable IC2 to perform the charging function through D9.

Additionally, IC2 monitors the battery charging status by detecting the battery voltage level through R10. IC2 charges the battery in three phases: conditioning, constant current and constant voltage. When the battery voltage drops below a threshold value ($V_{min}$), (the level of $V_{min}$ will depend on the type of battery being used) IC2 will apply a low current to pre-charge the battery. The conditioning charge rate can be adjusted with an external resistor (R3). After the battery is pre-charged to $V_{min}$, IC2 applies a constant current to the battery. An external sense-resistor (R4) sets the level of constant current. The constant current phase continues until the battery reaches the charge regulation voltage ($V_{REG}$) and then IC2 begins the constant voltage phase. Under this stage the charging current will gradually decrease. Charge stops when the current tapers to the charge termination threshold, $I_{TERM}$. IC2 will continue monitoring the battery voltage level and entering a new cycle of charging if the battery's voltage level falls below $V_{RECHG}$ (normally at $V_{REG}$—250 mV).

Deep Discharge Protection:

The longevity of rechargeable batteries is also enhanced when the batteries are prevented from being deeply discharged. Turning again to FIG. 2D, components Q1 and Q2 can be utilized to limit the discharge cycle while powering the LED array 116 in various embodiments. This protection is provided by essentially disconnecting the battery 108 from the LED array 116 when the battery voltage decays to a predetermined trigger point. The trigger point will be determined based on the type of battery being used.

Resistors R12 and R17 form a voltage divider that monitors/reflects the battery voltage. The voltage at the node between R12 and R17 will remain higher than the Q1 forward bias voltage as the fully charged battery voltage decays. When the battery voltage decays to such a level that the voltage at the node between R12 and R17 reaches or drops below the Q1 forward bias voltage, the Q1 collector will change states from low to high. The collector of Q1 is connected to the gate of Q2.

The N-Channel MOSFET (Q2) will act as a switch having output (LED_EN) that is connected to the ENable input (pin 4) of IC4 in the LED driver 114. As the battery voltage decays to the level of battery endpoint (such as 5.4 volts as an example), the state at LED_EN will change (to low), which will control IC4 of the LED driver 114 and turn the LEDs OFF by removing the cathode buss of the LED array from ground (via IC4) by causing the OUTput from IC4 to be open. This will prevent excessive discharge of the battery 108.

IC4 is an LED Driver device that controls the LED current and drawn through the LED array and can sink approximately 120 mA from the LED array 116. The value of R15 determines the amount of current the IC4 will sink. The formula for determining the sink current value is $I_{sink}$ (ma)=[610 (mv)/$R_{set}$ (ohms)]×1000. IC4 acts as a switch to interrupt the continuous LED ON condition (created upon the loss of AC input voltage), once the battery has decayed (discharged) to the battery endpoint. The output of Q2 is connected to Pin 4 of IC4. A battery voltage of less than a particular threshold, such as 5.4 VDC, will cause the output of Q2 (LED_EN) to go to approximately 0.0 VDC. IC4 will then act like a switch, which will disconnect the cathode buss of the LED array from ground and therefore, turn off the LED array. Turning off the LED array 116 will eliminate almost all battery drain (except for the battery self discharge, the current drain through the charger, and the USB circuitry), which will greatly reduce the possibilities of a deep discharge of the battery.

Battery Charging:

In some embodiments, the battery is constantly being charged during periods when the AC voltage is present. Once the battery has been charged to its full level, battery charging is interrupted (as described above) to prevent an overcharge condition. Additionally, once the battery has been depleted to its endpoint, the LED load is removed from the battery to prevent a deep discharge of the battery. The battery will remain at or slightly below the endpoint for extended periods of time and will only begin the charging process once the AC voltage input has been restored. The battery will support the LED array's power requirements for a period well in excess of 24 hours. Recharging the battery will require a period well in excess of 24 hours to reach the fully charged state.

Figure 2F:
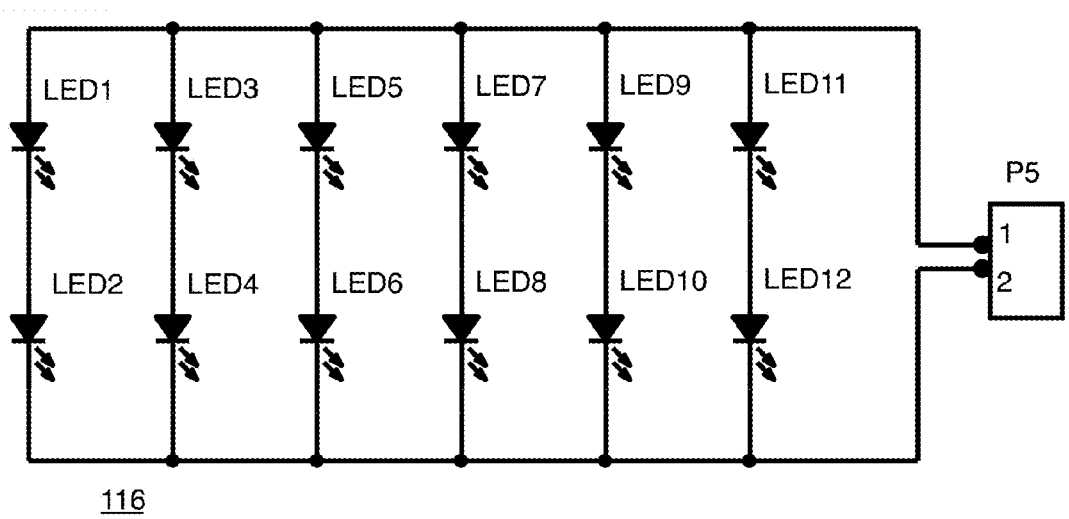
FIG. 2F is a schematic diagram illustrating an exemplary circuit for an LED array that could be used with various embodiments of the SA.
Figure 2E:
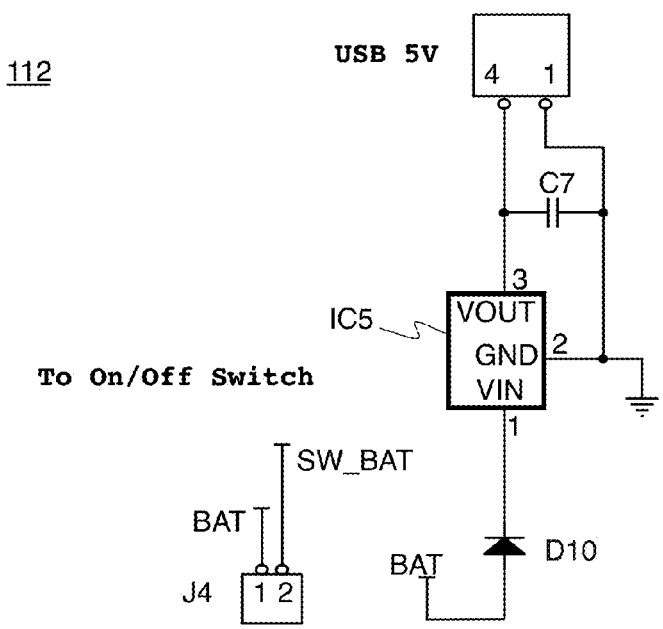
FIG. 2E is a schematic diagram illustrating an exemplary circuit for driving a device charger and for connecting the SA to the battery.

Battery Connection:

FIG. 2E is a schematic diagram illustrating an exemplary circuit for driving a device charger and for connecting the SA to the battery. A battery 108 may interface to the SA circuitry assembly at J4. The positive terminal will connect to pin 1 while the negative terminal will connect to pin 2 of J4. J4 can include switch in allow the battery 108 to be switched in and out of the SA.

Device Charging Port:

Looking again at FIG. 2E, during periods of extended power failures, it is quite common for communications, alert and other electronic devices to experience a depletion of their own internal batteries. As such, it is important to have a method of charging the batteries contained in these devices so as to maintain a communications link with families and emergency services. Various embodiments of the SA may incorporate a charging function, such as a USB port to support this function. However, it will be appreciated that other port types may also be used in the various embodiments, along with necessary adaptors to interface with the various charging interfaces such as the LIGHTNING CONNECTOR by APPLE, standard USB, micro-USB, etc. In addition, the lamp may also incorporate a stand that is suitable for docking of such electronic devices. Looking specifically at one exemplary embodiments, a USB port may be include and operate to provide the 5.0 VDC for charging an electronic device such as a cellular telephone and other similar devices during periods of normal operation (when AC voltage is present), as well as during periods when there is a loss of AC power and the SA is in operation running on the internal battery 100.

Still looking at FIG. 2E, the device charger 112 circuitry is further described. The battery 108 (and battery charging circuit 106 FIG. 2B) is connected directly to IC5 of the charging circuitry 106 through diode D10. The IC5 is a low drop-out voltage regulator with a fixed output voltage. The fixed output voltage could be any of a variety of required voltages such as 5 VDC as a non-limiting example. The output voltage of the device charging circuitry is connected to a device interface, such as the USB jack illustrated in FIG. 2E as a non-limiting example. In one implementation, a bulkhead mounted USB socket with associated wiring harness may be soldered OR affixed directly to the USB connector pads located within the SA. This harness allows the USB socket to be mounted in a convenient location along the lamp base. However, the positive 5.0 VDC is connected to pin 4 and the negative (ground) 5.0 VDC is connected to pin 1 of the USB jack and no other USB functions are required to be available through the USB 5V jack. Thus, some embodiments may only provide the battery charging function via the USB jack, while other embodiments may implement other USB functionality.

LED Lighting and Connection:

FIG. 2F is a schematic diagram illustrating an exemplary circuit for an LED array that could be used with various embodiments of the SA. The number of LEDs that are included in the various embodiments of the SA can vary depending on the application, lamp size or other device, as well as other factors and, it will be appreciated that the number, orientation and mounting of the LEDs can vary and, disclosed techniques or embodiments are provided only by way of example. For instance, the number of LEDs that are controlled may be limited by the amount of current that can be supplied to the LEDs or received from the LEDs, the desired life of a battery charge, the size and current supply of the battery, the shape and mounting constraints, etc. For example, on one embodiment, the LED current can approach 1.5 amperes. An exemplary embodiment of the SA may include twenty-two (22) white light LEDs while another embodiment may include twelve (12) white light LEDs as illustrated in FIG. 2F. Both of these described embodiments may be configured to include two LEDs in series with either eleven (11) parallel strings for a total of twenty-two (22) LEDS or two (2) LEDs in series with six (6) parallel strings for a total of twelve (12) LEDs as illustrated in FIG. 2F. The illustrated LED assemblies is shown as including a two (2) conductor plug (P5) which connects Pin 1 to the anode of LED1, LED3, LED5, LED7 LED9 and LED 11, and Pin 2 to the cathode busses of the LED array, namely LED2, LED4, LED6, LED8, LED10 and LED12. P5 is connected to the LED driver IC (IC3) by connecting plug P5 into connect J5 as a non-limiting example.

Such an embodiment of the control circuit may be constructed on a printed circuit board (PCB) while the light emitting diodes (LED) ring (donut) is constructed on a flexible circuit that is attached to a circular ring. The sealed lead-acid battery is held into place (in the base) via a battery box. The USB port is affixed inside the base to an external opening to allow for connecting a USB cord.

Table Lamp Embodiment

Figure 3:
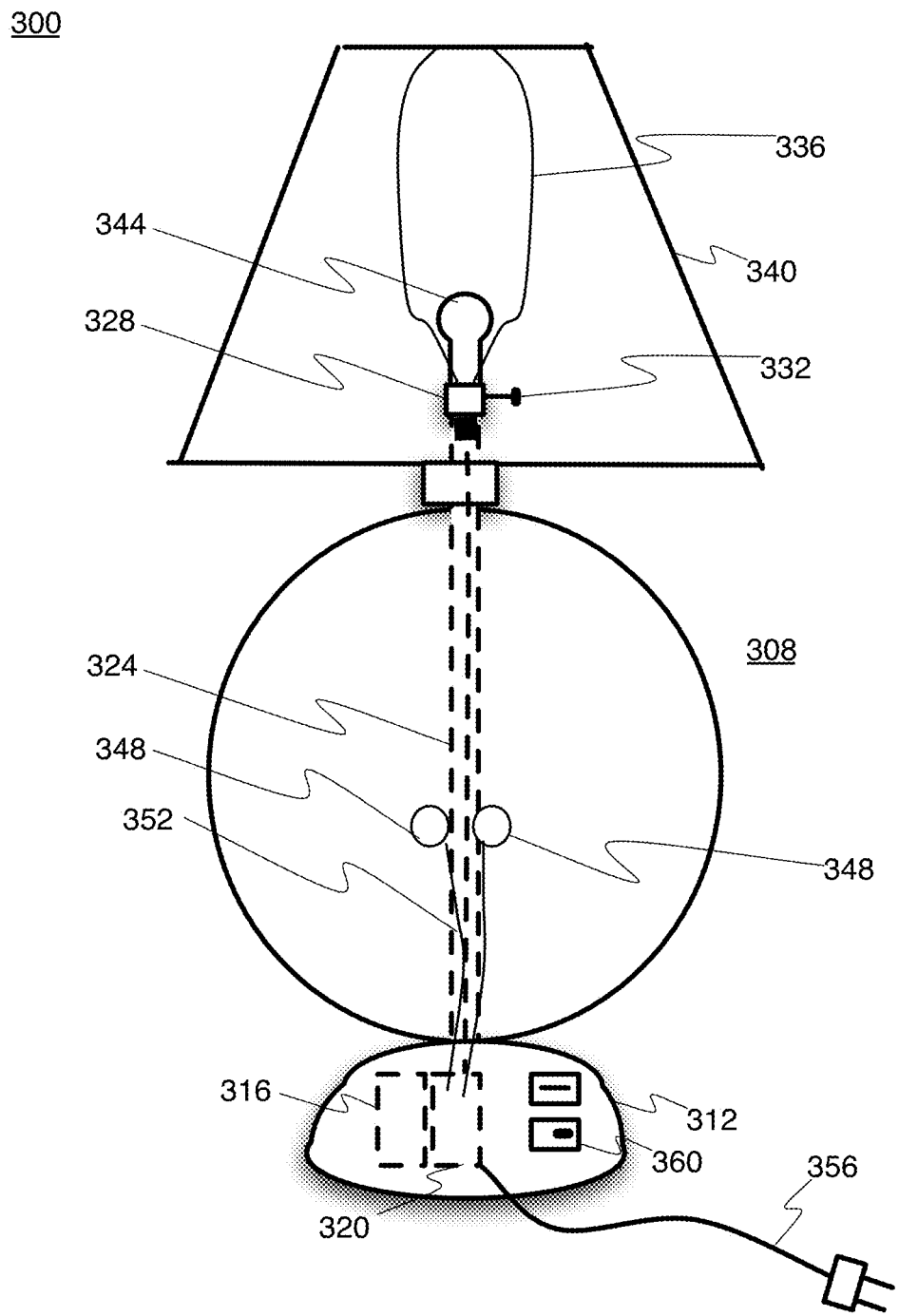
FIG. 3 is a conceptual diagram of an environment suitable for embodiments of the SA.

FIG. 3 is a conceptual diagram of an environment suitable for embodiments of the SA. A lamp 300, such as the illustrated table lamp, is built by assembling a lamp body 308 onto a base 312. The body 308 is hollow and can be made of opaque glass, colored glass, opaque plastic, perforated metal or other perforated material as to allow for a light source to illuminate through and beyond the lamp body. The lamp body 308 begins at the base 312 with a diameter sufficient to allow for a minimum 6" clearance inside of the base of the lamp body 308. Differing body designs can allow for varying lamp body 308 heights. The base is sufficiently wide to support the lamp and can be square, round, rectangular, or octagonal or another shape which will allow for approximately minimum width across a center point on the base inside of the lamp body 308 as to allow room for the battery 316 and charger/relay board 320.

Inside the body 308 and mounted on the base 312 there is a battery 316 and a charger/relay 320. There is an access opening in the lamp body 308 or base 312 for access to the battery and charger/relay board. There is a center rod 324 mounted on the base 312 which runs through the body 308. At the top of the center rod 324 there is mounted a conventional switched lamp socket 328 with a standard rotary switch 332 which can be either a single switched socket or a three way switched socket. Also attached to the top of the center rod 324 is a standard harp assembly 336 on which to mount a lamp shade 340. A lamp shade 340 of many styles and colors can be used. The socket 328 can hold a standard light bulb 344, which can be a conventional AC lamp bulb, CFL or LED bulb. The battery 316 can be any of a variety of chargeable or disposable batteries, and as a non-limiting example, a 6 volt sealed rechargeable battery can be used. The battery 316 is electrically coupled with one or more circuit boards 320 housing a charging board and a switching relay. There are at least two 6 volt halogen or led lamps 348 with low voltage leads 352 electronically connected to the charger/relay board 320. A conventional two wire PJT lamp cord 356 of sufficient length to reach from the lamp socket 328 down through the lamp body 324 and base 312 and allow at least four feet of length to extend to a wall outlet from the base 312 is also attached.

The center rod 324 connects to the base 312 and extends up from the base 312 through the lamp body 308 to the lamp socket 328 as to assemble all the aforementioned components into a single unit or a rodless body with the lamp socket 328 affixed to the top of the lamp body 308.

The unit is assembled by starting with the base 312 and affixing the battery 316 to the base 312 using a conventional mounting method as to prevent the battery 316 from moving as the lamp is moved. A DC switch 360 may be installed at the base 312 so the battery 316 can be turned off. The charging/relay board 320 may be mounted opposite the battery 316 or otherwise attached to the base 312. The lamp cord 356 is trough up through the base 312 to the point of the charging/relay board 320 with approximately four feet extending outside the base 312 as to allow for plugging the lamp into a wall outlet when the lamp is put into service. The lamp cord 356 will terminate at the point of the charging/relay board 320 with the primary power source leads from the relay board 320 and a sufficient amount of lamp cord to extend up through the center rod assembly 324 where it will terminate at the lamp socket 328.

A junction can be made including the wires to the lamp cord 356, the wire to the socket 328 and the primary source volt leads to the charger/relay board 320. The two or more low voltage lamps 348 will be attached to the center rod 324 approximately half-way up the height of the rod 324 inside the lamp body 308. The wires 352 from these lamps will extend down to and terminate on the charger/relay board 320. The center rod 328 will be attached to the base 312 by an open bracket as to allow for the lamp cord 356 coming from the socket 328 to exit the rod 324 at the base 312 to the junction area near the charger/relay board 320. After this wiring is installed in the rod 324 the lamp body 308 can be installed on the base 312 with the end of the center rod 324 going up through the top of the lamp body 308 through a hole of sufficient size for the rod 324 to fit closely in the hole. The rod 324 will extend above the lamp body 308 approximately ½ inch, which will allow for mounting the harp assembly 336 and lamp socket 328. The rod 324 is threaded at the top. Installing a locknut onto the rod assembly 324 down to the top of the lamp body 308 will make the base 312 and lamp body 308 one rigid assembly. The harp will now be installed over the threaded end of the rod 324. The lamp cord 356 will be terminated on the lamp socket 328 and the socket 328 is now installed onto the end of the center rod 324 on top of the base of the harp assembly. After installing a lamp bulb 344 and lamp shade 340 the fixture can be used as a regular table lamp.

The present invention is well adapted to carry out the objectives and attain both the ends and the advantages mentioned, as well as other benefits inherent therein. While the present invention has been depicted, described, and is defined by reference to particular embodiments of the invention, such reference does not imply a limitation to the invention, and no such limitation is to be inferred. The depicted and described embodiments of the invention are exemplary only, and are not exhaustive of the scope of the invention. Consequently, the present invention is intended to be limited only be the spirit and scope of the claims, giving full cognizance to equivalents in all respects.

It will be appreciated that embodiments of the SA can likewise work with other target devices, such as a chandelier, a floor lamp, a night light, an overhead light, a wall outlet (illuminating when power goes out, thus multiple units can be spread throughout the house), a light switch, an appliance, etc.

Figure 4:
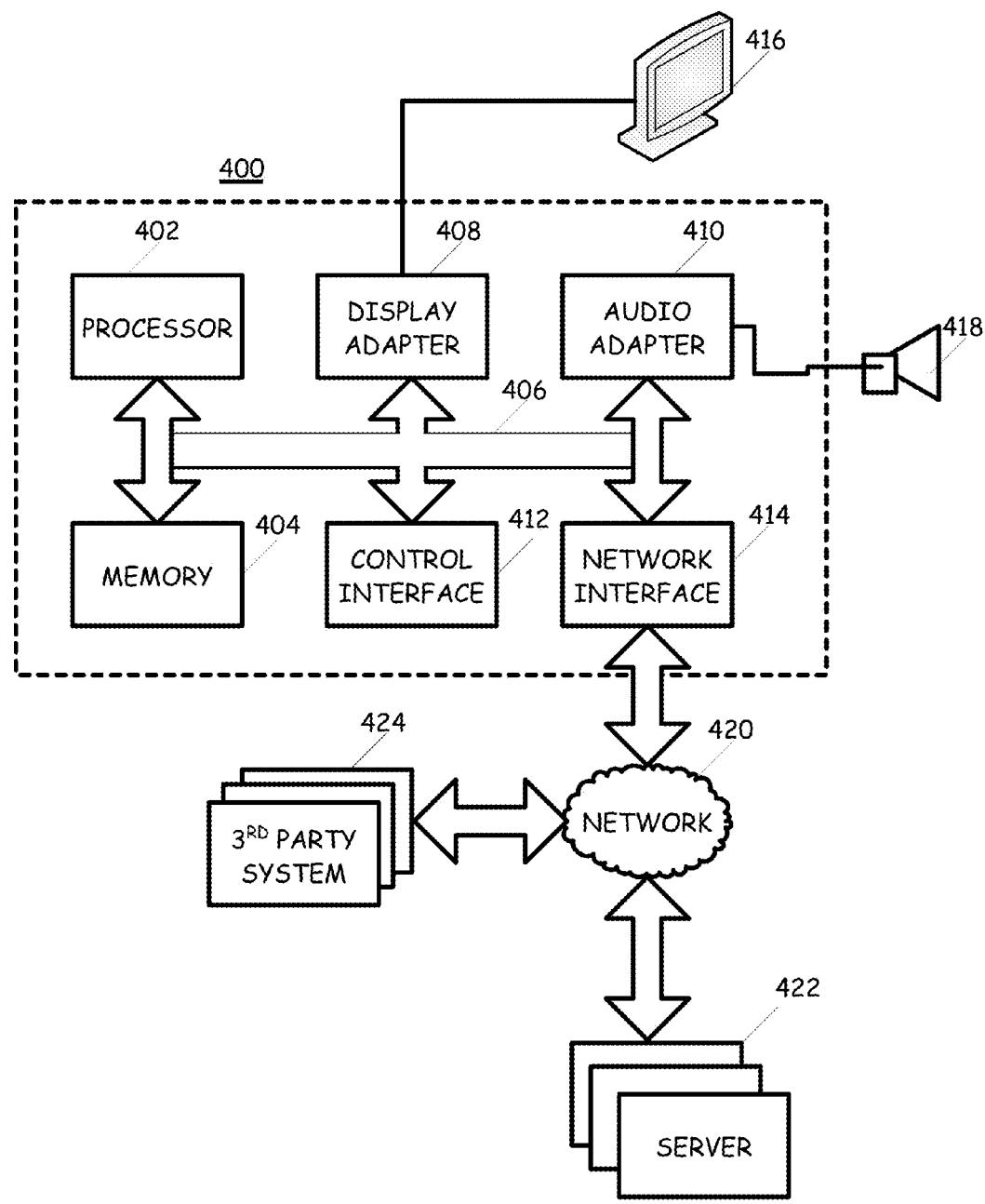
FIG. 4 is a functional block diagram of the components of an exemplary embodiment of system or sub-system operating as a controller or processor 400 that could be used in various embodiments of SA controlling aspects of the various embodiments.

FIG. 4 is a functional block diagram of the components of an exemplary embodiment of system or sub-system operating as a controller or processor 400 that could be used in various embodiments of SA controlling aspects of the various embodiments. It will be appreciated that not all of the components illustrated in FIG. 4 are required in all embodiments of the SA but, each of the components are presented and described in conjunction with FIG. 4 to provide a complete and overall understanding of the components. The controller can include a general computing platform 400 illustrated as including a processor/memory device 402/404 that may be integrated with each other or, communicatively connected over a bus or similar interface 406. The processor 402 can be a variety of processor types including microprocessors, micro-controllers, programmable arrays, custom IC's etc. and may also include single or multiple processors with or without accelerators or the like. The memory element of 404 may include a variety of structures, including but not limited to RAM, ROM, magnetic media, optical media, bubble memory, FLASH memory, EPROM, EEPROM, etc. The processor 402, or other components in the controller may also provide components such as a real-time clock, analog to digital convertors, digital to analog convertors, etc. The processor 402 also interfaces to a variety of elements including a control interface 412, a display adapter 408, an audio adapter 410, and network/device interface 414. The control interface 412 provides an interface to external controls, such as sensors, actuators, drawing heads, nozzles, cartridges, pressure actuators, leading mechanism, drums, step motors, a keyboard, a mouse, a pin pad, an audio activated device, as well as a variety of the many other available input and output devices or, another computer or processing device or the like. The display adapter 408 can be used to drive a variety of alert elements 416, such as display devices including an LED display, LCD display, one or more LEDs, low voltage lamps or other display devices. The audio adapter 410 interfaces to and drives another alert element 418, such as a speaker or speaker system, buzzer, bell, etc. The network/interface 414 may interface to a network 420 which may be any type of network including, but not limited to the Internet, a global network, a wide area network, a local area network, a wired network, a wireless network or any other network type including hybrids. Through the network 420, or even directly, the controller 400 can interface to other devices or computing platforms such as one or more servers 422 and/or third party systems 424. A battery or power source provides power for the controller 400. Utilizing a controller 400, various functions of the SA can be provided such as detecting the loss of primary power, controlling the charge of the battery, turning on and off the LED array, etc.

Thus, a class of embodiments of the SA include an apparatus or a method to modify a target device such that it contains some low powered illumination devices that are powered by a battery and will be automatically turned on upon the loss of a primary power source. Further, embodiments also include a device charger, such as a USB port integrated into the target device and configured to charge various devices.

The various embodiments of the SA may be used in many different applications. As mentioned above it can be used in a table lamp to provide emergency light and USB charging capability during a power outage. It can also be used in other devices such as cell phone docks, clock radios and like devices in order to provide for a source of light and phone/pad charging during a power outage. The circuit can also be used in these type devices without the emergency LED light source while still providing the ability to charge phones/pads with or without AC power present.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A battery powered lighting system that parasitically attaches to a target device, the system comprising:
   a battery;
   a low power illumination device;
   a power supply for converting an AC voltage to a DC voltage for charging the battery;
   a switch configured to detect the presence of the AC voltage and, when the AC voltage is not present, causing the battery to power the low power illumination device; and
   a battery charger that is configured to prevent over charging of the battery and to prevent over discharging of the battery.

2. A battery powered lighting system that parasitically attaches to a target device, the system comprising:
   a battery;
   a low power illumination device;
   a power supply for converting an AC voltage to a DC voltage for charging the battery;
   a switch configured to detect the presence of the AC voltage and, when the AC voltage is not present, causing the battery to power the low power illumination device; and wherein the system attaches to the power cord of a target device, wherein the system attaches to the power cord of the target device by receiving a severed end of a power cord distal from the plug into a first connector and receiving a severed end of the power cord distal from the target device into a second connector whereby the severed cord is rejoined through the battery powered lighting system.

3. A battery powered lighting system that parasitically attaches to a target device, the system comprising:
   a battery;
   a low power illumination device;
   a power supply for converting an AC voltage to a DC voltage for charging the battery;
   a switch configured to detect the presence of the AC voltage and, when the AC voltage is not present, causing the battery to power the low power illumination device; and
   a light detector being configured to turn on the low power lighting system in the absence of detecting light.

4. A battery powered lighting system that parasitically attaches to a target device, the system comprising:
   a battery;
   a low power illumination device;

a power supply for converting an AC voltage to a DC voltage for charging the battery;

a switch configured to detect the presence of the AC voltage and, when the AC voltage is not present, causing the battery to power the low power illumination device; and a battery charger that is configured to charge the battery when AC voltage is present but to prevent over charging of the battery and to detect a current voltage level of the battery when AC voltage is not present and prevent over discharging of the battery by turning off the low power illumination device when the current voltage level of the battery drops below a threshold value.

5. A battery powered lighting system that comprises:

a power supply that is communicatively coupled to a primary power source and configured to convert a signal from the primary power source to a DC voltage level;

a battery;

a battery charger electrically coupled to the battery and configured to charge the battery when the primary power source is available;

an LED array including a plurality of LEDs;

an LED switch electrically coupled to the power supply and the battery and configured to detect the presence and absence of the primary power source;

an LED driver electrically coupled to the battery, power supply and LED switch and in response to receiving an LED enable signal from the LED switch, being configured to provide power to the LED array;

a device charger electrically coupled to the battery and the power supply and configured to provide a charging current to an external device either from the primary power source or the battery.

6. The battery powered lighting system of claim 5, wherein the power supply taps into the power cord of a target device.

7. The battery powered lighting system of claim 6, wherein the target device is a table lamp.

8. The battery powered lighting system of claim 5, wherein the battery charger monitors the charge on the battery and terminates charging when the battery has reached a threshold charge level.

9. The battery powered lighting system of claim 5, wherein the LED driver monitors the charge on the battery when the battery is powering the LED array and, turns off the LED array to prevent the battery from over discharging.

10. The battery powered lighting system of claim 5, further comprising a device charger for charging an external device.

11. The battery powered lighting system of claim 5, wherein the device charger is driven by the power supply when the primary power source is available and by the battery when the primary power source is not available.

12. The battery powered lighting system of claim 11, wherein the device charge conforms to the USB interface.

13. The battery powered lighting system of claim 5, wherein the system is integrated into the base of a table lamp.

14. The battery powered lighting system of claim 5, wherein the system is integrated into a lamp shade.

15. The battery powered lighting system of claim 5, wherein the device is integrated into a screw in socket that can be inserted into a light bulb socket and that also can receive a light bulb into its socket.

* * * * *